Jan. 20, 1970   W. H. LEA   3,490,234

STEAM ENGINES

Filed Sept. 1, 1967

INVENTOR.
WENDELL H. LEA
BY
Curtis, Morris & Safford
ATTORNEYS

United States Patent Office 3,490,234
Patented Jan. 20, 1970

3,490,234
STEAM ENGINES
Wendell H. Lea, Englewood, N.J. (Seamen's Unit, Rincon Annex, San Francisco, Calif. 94119)
Filed Sept. 1, 1967, Ser. No. 665,004
Int. Cl. F01k *19/10;* F01b *31/08*
U.S. Cl. 60—95                           19 Claims

ABSTRACT OF THE DISCLOSURE

Disclosure is directed to a method of and steam engine for approaching the efficiency of the Carnot cycle. In accordance with the method, steam is expanded adiabatically, exhausted at a location remote from the walls, condensate injected into the remaining steam and the mixture compressed adiabatically, heat is stored in the engine walls during compression and delivered back to the steam during expansion and superheated steam injected at the end of compression to remove all moisture. The engine is constructed to perform all of these method steps.

The present invention relates to a method of and apparatus for improving the efficiency of a power plant in producing useful work from steam.

All previous engines using a vapor as a working fluid, which in most all applications is steam, have used the Rankine cycle, with and without superheat and reheat processes during expansion, and with or without regeneration, but always with a total condensation of the exhaust vapor to liquid. No engine has ever been made to operate as a steam engine on a Carnot cycle, or with adiabatic compression processes on vapors to which the present invention relates. Instead, all previous uses of the Carnot cycle, and especially any modifications of it, have been conceived as being only an ideal to be approached with perfect gases and not useful in the wet region of vapors, such as steam, where condensation is apt to occur.

One of the objects of the present invention is to provide a method of and apparatus for improving the efficient use of steam to produce work which more closely approaches the ideal Carnot cycle than the systems previously used with steam.

Another object is to provide a method of and apparatus for minimizing the heat losses from an engine to adapt it to approach the ideal Carnot cycle.

A further object is to achieve maximum expansion of the working fluid in the smallest possible volume to minimize operating losses and thereby increase the overall thermal efficiency.

Another object is to provide an improved structure in a steam engine to increase its overall thermal efficiency which is of relatively simple and compact construction, economical to manufacture and reliable in operation.

These and other objects will become more apparent from the following description and drawings in which like reference characters denote like parts throughout the several views. It is to be expressly understood, however, that the drawings are for the purpose of illustration only and are not a definition of the limits of the invention, reference being had for this purpose to the appended claims.

Figures 1, 2, 3, 5:
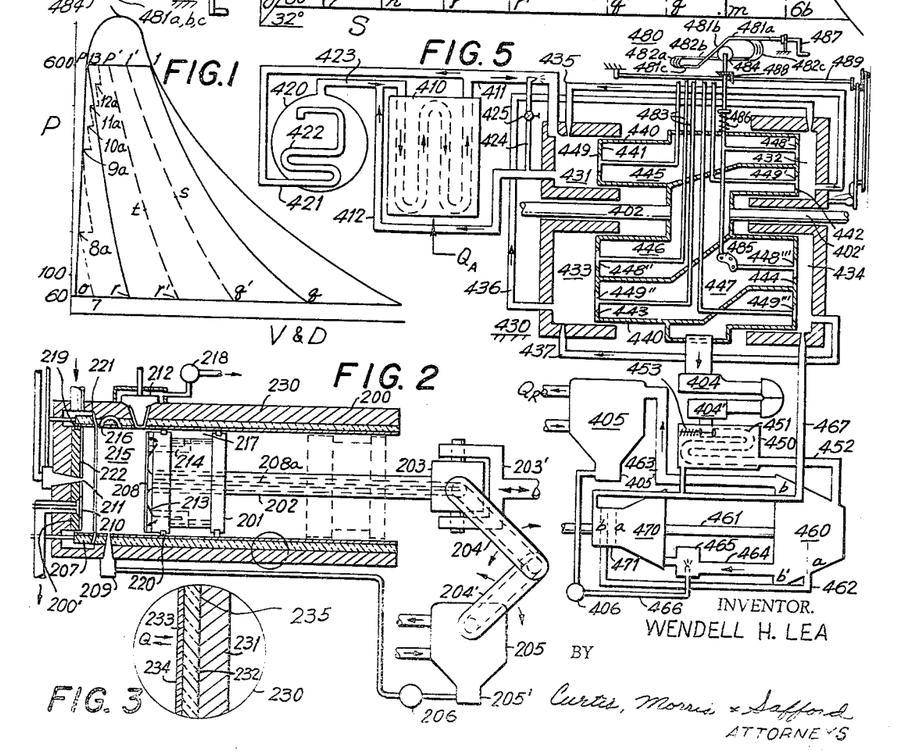
FIGURE 1 is a pressure-volume diagram which shows the Carnot cycle in full lines and the regenerative adiabatic compression steps of the cycle of the present invention in dotted lines.
FIGURE 2 is a transverse sectional view of the cylinder of a single acting uniflow steam engine adapted to operate on the improved cycle of the present invention.
FIGURE 3 is an enlarged sectional view of a portion of the cylinder wall to show its composite structure for absorbing and delivering heat to provide a heat regenerative effect between compression and expansion.
FIGURE 5 is a diagramatic view of a power plant including a multicylinder engine and the fluid and mechanical connections between the several components thereof.

The method of the present invention comprises the step of supplying a saturated vapor, such as steam derived from water, mercury and the like, to an engine at a predetermined pressure indicated by the point P on the P–V diagram in FIGURE 1. While the method of the present invention is intended to include any vapor, the following description will be directed to steam formed from water, but it will be understood that this term is intended to include other vapors. Steam is admitted with a piston displacement from the point P to the point 1 and is then expanded adiabatically from the point 1 on said diagram to the point $q$ at a lower pressure 0 and having a larger volume. At least a part of the steam is then exhausted from the engine along the constant pressure line from point $q$ to point $r$ at the pressure 0. After or during the exhausting step a quantity of water corresponding to the weight of steam exhausted is injected into the engine and the resulting mixture with the remaining steam is compressed from the point $r$ back to the initial point P to reduce the remaining vapor to liquid. The liquid leaving the cylinder is then converted back to its initial saturated state by the application of heat. In some applications of the method, the mixture of condensate and steam are only reduced to a low quality mixture before being heated back to its initial state, either in a single step in a single cylinder engine or in a plurality of steps when using a multiple expansion engine.

In FIGURE 1 the points $p$, $1'$, $q'$ and $r'$ sometimes indicate the quality of the steam, as in a usual P–V diagram but sometimes they also indicate the position only of a piston in an engine in which the method is performed.

In performing the above method steps, various additional steps are required to a greater or lesser extent to approach the Carnot cycle. While all of these additional steps should be performed to the greatest degree under practical operating conditions to produce the highest thermal efficiency, any of the steps will improve the efficiency of the overall cycle to some degree. The first of these steps is the supplying of steam, preferably at a pressure approaching the critical pressure, without restriction and wire drawing by instantaneously providing a wide open port and instantaneously providing a fully closed port after the steam has been admitted. Another step is the exhausting of the steam at a place remote from the walls of the steam confining space to prevent the removal of heat from the walls, resulting from turbulence, to the greatest extent possible. The water injected into the engine is preferably the condensate from the exhausted steam, or stored condensate, and is injected after exhaust from the steam space has been completed as represented at $r$ and prior to compression from the point $r$ back to the point $p$. Prior to admission of steam to start a new cycle, superheated purging steam is injected to sweep all condensate from the walls of the engine and out through a port from the steam space maintained at the same or a higher pressure than the fluid then in the cylinder. And last and perhaps the most essential step is to store heat supplied to the walls of the engine during compression and deliver the stored heat back to the steam during expansion to provide a heat regenerating effect between the compression and expansion steps to produce a dry wall.

When the present invention is used with a multiple expansion engine, steam exhaust from one place of expansion is delivered to another place for expansion, at least a portion of the expanded steam is compressed at the place of expansion, the compressed wet steam and condensate discharged from each place of expansion is injected into steam to be compressed so that the method is performed at each place of expansion in the same way as explained above. These series of steps in successive places of expansion provide for regenerating the working fluid during expansion and compression, reduces the volume of the steam in subsequent stages of expansion, combines the steps of supplying steam and expanding the steam at each place of expansion and combines the steps of exhaust and compression.

One simple form of one cylinder engine in which the steps of the method may be performed is shown in FIGURE 2 as comprising a cylinder 200 having a piston 201 therein with a piston rod 202 connected to a cross head 203 for actuating a work producing element such as a crank shaft and flywheel (not shown). The piston rod 202 and crosshead 203 are hollow to provide an exhaust passage remote from the walls of the cylinder and the crosshead is connected through hollow articulated links 204 to a condenser 205.

The cylinder 200 is provided with seven valves 207 to 213 for controlling the various method steps. Valve 207 is a ring valve having sealing rings 219 for opening and closing an annular port 221 in the cylinder wall adjacent the cylinder head 222 which has a recess therein to accommodate the valve. As stated above, the ring valve 207 is adapted for a rapid opening or closing of the annular port 221 to reduce resistance to the delivery of steam to the cylinder space 215. Valve 208 is an exhaust valve located in the face of the piston 201 for opening and closing the exhaust passage through the hollow piston rod 202 and has a rod 208a operated by a suitable valve actuating mechanism. Valve 209 is located in the wall of the cylinder 200 for the injection of condensate prior to the compression stroke of the engine. As illustrated, a pump 206 receives condensate from condenser 205 and sprays it through valve 209 to the interior of the cylinder. A discharge valve 210 for compressed steam and an inlet valve 211 for superheated steam are located in the cylinder head. A purge valve 212 is provided in the wall of cylinder 200 adjacent the cylinder head for purging condensate from the cylinder and valves 213 are one way valves located in the piston 201 to control flow of steam from the space 215 between the cylinder head and piston and into an annular recess 217 at the periphery of the piston. The wall of the cylinder 200 also has a bypass 216 therein for connecting the steam space 215 to the annular recess 217 in the periphery of the piston just prior to the end of a discharge stroke to purge condensate from the steam space through the exhaust valve 212.

As shown in FIGURE 3, the wall 230 of the cylinder 200 is constructed to absorb heat during compression and give off heat during expansion to provide a heat regenerative effect between compression and expansion steps. To this end, the wall 230 has an outer structural shell or casing 231, an intermediate mass or layer of a heat insulating material 232, such as Pyrex glass, and an inner mass or layer 233 adjacent the steam space 215, of a good heat conducting material, such as copper. The inner surface of the layer 233 of copper may be electrolytically coated with a metal such as chromium to provide a good bearing surface 234 for the piston.

The volume increase of the process from the point $p$ to 1 in the diagram of FIGURE 1 occurs in the boiler, but is equal to the admission volume corresponding to length $p$ to 1 of the cylinder, and in a like manner condensation, $q$ to $r$ occurs in the condenser, but is equal to the volume change corresponding to length $p$ to 1 of the return stroke. However, the adiabatic processes indicated in FIGURE 1 occur in the cylinder. All volumes occupied by the liquid in FIGURES 1 and 2 are not shown, as being too small.

Under full load, steam at a saturated state at point 1 in FIGURE 1 enters the engine, of a volume of $p$ to 1, through the annular admission valve 207, to minimize throttling loss. This valve construction allows a minimum clearance space and losses, since the valve operation in no way interferes with the full piston travel to a position up against the cylinder head 200. The speed of the closing of the valve 207 is in such a ratio to that of the piston that its displacement volume is equal to that displaced by the piston during the closing period thereby arresting all flow of the steam through the valve and eliminating all wire drawing of it.

Admission ends by the cut off action of valve 207 and the steam expands adiabatically from 1 to $q$, which is near to the end of the power stroke. The exhaust valve 208 opens at this point and the piston moves a short distance to the very end of the power stroke. The displacement caused by this additional movement of the piston is filled by a very small volume of condensate, which is at the same pressure and temperature state as point $o$, FIGURE 1. The weight of this condensate is equal to that weight of steam which will be exhausted, and completely condensed to point $o$, FIGURE 1 and is taken from the condenser sump 205′, FIGURE 2. The previously exhausted steam which has been condensed in condenser 205 is injected through the injector valve 209 into the steam at the head end 200′ of the cylinder space 215 by pump 206 in such a manner as to promote thorough mixing, but only from the head end 200′ to a length of the cylinder $o$ to $r$. Therefore cylinder pressure does not rise.

Steam at a pressure, temperature and quality indicated at point $q$, FIGURE 1, is then exhausted by the return stroke to a position $r$, of FIGURE 2 and through the exhaust valve 208 in the piston face, hollow piston rod 202, hollow crosshead 203 and hollow links 204 and 204′ to the condenser 205 where it is completely condensed to a liquid of state point $o$, FIGURE 1.

This method of exhaust through said piston face preserves the uniflow character of the engine and all its advantages of avoiding contact between the cold exhaust steam and hot intake surfaces at the head end 200′ and it does this without the need of high vacuum exhausts or cylinder wall valves used in the prior art.

The point of exhaust cut off is so adjusted that the weight of steam remaining in the cylinder space 215, FIGURE 2, is such that when combined with the properly adjusted weight of said condensate injected into it, equal to the weight of the exhausted steam, forms a lower quality state corresponding to point $r$, FIGURE 1, which has the same entropy value as the steam at point $p$. Thus the subsequent adiabatic compression stroke from this point $r$ will result in the working fluid being at state $p$, which is on or near the liquid line, for the beginning of a short discharge stroke (shown only at point $p$).

The weight of steam entering and leaving said cylinder and during all process in it is a constant, always remaining the same, except after beginning injection stroke $o–r'$ and until after exhaust completion $q–r'$ during which period it is larger. Processes external to the cylinder only change the quality of the steam.

At point $p$ a discharge valve 210, FIGURE 2, opens and the wet steam or liquid is discharged to a wet steam reheater usually called a boiler and is so termed here for clarity. Such a boiler 410 illustrated diagrammatically in FIGURE 5 raises the quality of the steam from a very low value to a higher one of about 100%, that is to dry saturated steam. For this purpose the discharge valve 210 may be combined with the admission valve 207 in such a way as to a form single two way valve without altering the concept of this feature. This valve 210 may also be shaped in an annular form so as to provide a greater area of aperture to reduce throttling and may open inward.

After being heated to dry steam in the boiler 410 and thereby brought to point 1, FIGURE 1, a new charge of steam leaves said boiler and is again taken into the cylinder 200 as before and the cycle is repeated.

One effect of the compression stroke *r–p* is to raise the temperature of the steam above that of the average temperature of cylinder wall 230 with the result that heat is transferred to said wall from the steam and raising it to the initial steam temperature. The effect of working in the vaporous region is that some condensate will remain on the wall. It is a particular feature of this invention to remove all this wetness from the cylinder 200 and leave perfectly dry surfaces on the cylinder space 215 before the beginning of admission *p–1*. This is accomplished by injecting dry and superheated steam into the very small clearance space 215 left at the end of the return stroke *p* through purge valve 211 and with a suitable force and velocity to complete by purge all condensate from the space 215. Said jet of steam is directed in such a manner as to drive all moisture off the piston face and cylinder head 200, surfaces to and through the several passages 216 in the cylinder wall and then into and through space 217 and out condensate purge valves 212 which are suitably located around the cylinder wall 230. Pump 218 then forces the removed condensate back to boiler superheat tubes (not shown) for reheating and return through one or more injection valves 211. As this purging steam is under higher pressure than the working fluid it is preferably heated in a set of tubes (not shown) separate from the rest of the boiler 410 heating surfaces. The increase in the weight of purging fluid that results from the wall condensate, can be left in the cylinder spaces 215, purged as compressed superheated steam, or returned as condensate to the regular boiler cycle through a float check valve (not shown). Thus, saturated admission steam enters a perfectly dry cylinder space 215 which is at the initial temperature and therefore it loses no heat immediately as is the case in conventional engines. It will be noted that the compressed fluid in the steam spaces 215 and 217 eliminates the clearance losses which would occur if the exhaust pressure steam only filled these spaces.

For partial load conditions the complete piston cycle of operation *p* back to *p*, is hereinbelow divided into six parts each of which is called a stroke. In FIGURE 1 the prime marks (′) show piston positions and pressure and not necessarily quality of the steam. The power stroke is shown in FIGURE 1 as composed of the admission *p* to 1′, expansion 1′ to *q′*, and injection *q′* to *q*, and the return stroke of exhaust *q* to *r′* compression *r′* to *p′* and discharge *p′* to *p*. This cycle gives an expansion to *q′* at which point the exhaust valve 208 opens, FIGURE 2, and previously exhausted steam stored in the condenser 205 enters to fill the void in cylinder space 215 created by the moving piston 201 so as to maintain a constant exhaust pressure of *q* and thereby a constant steam temperature acting on the cylinder wall 230. Point *p′* indicates a smaller volume and therefore smaller weight of steam in the cylinder at admission cut-off, but of the same quality as that of point 1, FIGURE 1, for full load setting. At other times these prime points will represent quality as usual. A weight of condensate just equal to that weight of the net exhaust steam that is to be later exhausted from *q* to *r′* is injected at the head end of the cylinder through valve 209. This injection is so directed to the center of the cylinder as to minimize contact of liquid with the wall and yet provide for mixing. During this injection there occurs a reverse exhaust stroke *q′* to *q* at which time steam previously delivered from space 215 toward the condenser is sucked back to fill the void. As an alternative, such working medium to fill the void may be introduced into the space 215 adjacent the head 222 through valve 209 to displace the expanded steam toward the piston. The steam then in the space 215 at the point *q* is exhausted during the return stroke of piston 201 from the point *q* to point *r′* with a net exhaust between *q′* to *r′* so as to avoid any drop in pressure. Compression *r′* to *p′* now ends at *p′* instead of *p*, and the discharge stroke *p′* to *p* expels the resulting low quality and compressed steam, now at boiler pressure out through the discharge valve 210, FIGURE 2, and back to the boiler. With this condition, *r′* and *p′* represent steam quality (higher than that at *r* and *p*, respectively) and the corresponding volume of it or, in other words, piston displacement.

It is a particular feature of this invention to maintain the same constant total duration of the initial temperature strokes from the engine to the boiler and from the boiler to the engine, *p′* to *p* and *p* to 1′, and also that of the sink temperature periods *q′* to *q* and *q* to *r′* for all various load settings from full load to no load, so that only the net admission period and net exhaust period change and thereby hold a constant overall cylinder wall temperature (with and due to fixed initial and exhaust temperatures). To this end, admission and discharge strokes are always adjusted by shifting the cut-off points 1′ and *r′* and thereby shift both the expansion and compression strokes so that the strokes occur along the lines *s* and *t* at partial loads as illustrated in FIGURE 1 which approach each other in corresponding increments. Thus, the period of discharge increases an amount corresponding to the decrease in the period of admission so the sum of the admission and discharge periods is always substantially equal; and decreases in the time when exhaust occurs, corresponds with increases in the time when injection occurs, so that the sum of these periods of time is substantially equal.

The present invention eliminates high wall losses under frequently varying loads conditions. It will be observed that an advantage of the improvement is that a constant average wall temperature is held with varying loads so as to eliminate a high percentage of wall losses. A departure in wall temperature from the median would tend to disproportionately increase with temperature difference or duration of it, upsetting the matching regenerative capacity of the copper liner, as explained hereinafter. Thus, the adjusting of the admission and compression strokes and the construction of the wall maintains a nearly constant efficiency over the entire range of loads. This wall construction and operation makes this engine particularly advantageous for applications involving a variation in load at constant speeds as that of driving electrical generators or railroad locomotives.

With the cycle of the present invention, however, much of the heat lost into the cylinder wall 230 is not taken from the initial steam, as said cylinder wall already will have been heated by the steam that was compressed on *r* to *p* or *r′* to *p′*, FIGURE 1, to the initial state point so that hot initial steam will not immediately follow cold exhaust steam as in conventional engines. Further, the temperature of the adjacent incremental surface 234 of the wall 230 at any instant was produced by the heat of compression transferred to it internally at almost the same temperature as that steam under compression so as to allow an almost reversible heat transfer. A particular feature of this invention, therefore, is to provide a means of storing heat in the wall 230 and returning each increment of it, back to the steam during expansion, 1 to *q* or 1′ to *q′*, FIGURE 1, at the same temperature at which it was transferred to the wall 230, also as to provide a reversible heat regenerative effect between said compression process and said expansion process, and thereby retaining the same availability of it for conversion back to work.

The compression process provided by this new cycle is the first part of several for eliminating high wall losses and raises the wall temperature before admission so that there is time to remove the condensation that supplies the necessary heat for this increase before said admission begins. A second part is the purging of the cylinder space with a dry steam jet that removes all this condensation rapidly to the boiler 410, see FIGURE 5 and leaves the wall surface 234 dry. The third part is the jacket space 217, see FIGURE 2, between the sealing rings 220 on the piston 201 which extends the effects of the first and second parts to that area of the cylinder wall 230 which would not otherwise be in contact with the compressed steam $r'-p'$, but will be in contact with the initial and all partly expanded steam $p'-1'$ and $1'-s$ that is still hotter than the glass 232 at any point of expansion. The fourth part is the copper regenerative liner 233 which during compression $t-p'$ serves to absorb the heat for regeneration at the same temperature at which it will be returned to the steam. This heat in a conventional engine wall or one with glass alone, would be absorbed at a much lower temperature than steam and returned at a still lower temperature resulting in the well known loss of availability. Thus, the composite wall of glass 232 and copper 233 regenerates the expanding steam $1'-q'$ perfectly.

As stated above, the composite wall 230, shown in FIGURE 3, comprises a suitable structural material as steel 231 with a layer or mass of material of low heat conductivity, but one which is able to bear a fluctuating bulk compressive stress at high temperature, such as Pyrex glass 232. Hereinafter, glass will be the term used for simplicity as indicating such a material. For purpose of said glass is to impede the flow of heat into or out of the wall 230 to the extent of eliminating all temperature fluctuations in the steel 231. This glass 232, in turn, is lined with a thin layer 233 of a highly heat conductive metal, such as copper (which term is hereinafter used for any high heat conductive material which acts as the heat regenerator). Preferably, the glass is backed by a reflective layer 235, which reflects radiation back through the glass to the copper, thereby preventing it from heating the steel.

During part of compression $t$ to $p'$ all of admission $p$ to $1'$ and part of expansion $1'$ to $s$, in space 217 formed by the outside piston surface and rings 220 against the cylinder wall 230, condensation continues to supply heat to the copper liner 233 and the glass 232.

Steam enters the annular space 217 at the periphery of the piston through check valve 213 and passage 214. However, all this condensation is swept from the walls by the top piston ring 220 before the wall is exposed to expansion steam. Such condensate is exhausted to the boiler 410 at the end of the cycle as before by the purge system. This condensate in jacket space 217 can never evaporate and cool the wall 230 as it is retained in the jacket space by the check valves 213 which hold it under pressure until the next said purge process. Furthermore, the condensate never returns to steam space 215, but always continues in the same direction out valve 212 and acts as a lubrication for the piston.

During the admission stroke, $p$ to $1'$ the high temperature initial steam gives up only some part of its heat to the originally dry surfaces of the copper liner 233 which is necessary to compensate for heat conduction losses Q passing through the hot copper 233 into the glass 232. During this heat transfer, the wall 230 remains at its lower average temperature $s$, FIGURE 1 while said copper due to its very high conductance $$\left(2616 \frac{\text{B.t.u.} \times \text{inch}}{FT^2 \times °F \times \text{hr.}} \text{ vs. that of glass} = 6\right)$$

is always at, or very near, the temperature of the steam when the wall surface 234 is wet. When dry it will assume a temperature closer to that of said glass.

This heat loss to the wall 230 results in slight condensation on the copper wall surface 234 throughout the admission stroke $p-1$. The copper liner 233 immediately upon expansion $1'-q'$ of the steam, and its temperature drop, gives up its heat to this condensate. This re-evaporation occurs at almost the same temperature as the steam, due to high conductivity of the copper, thereby permitting the reversible conversion of this heat back to work at the same temperature at which it was received per unit weight of equivalent condensate from the work of compression $r'-p'$.

This reversible conversion of heat will have the effect of again producing a dry copper surface 234 just at the end of the expansion stroke $1'-q'$, the copper liner having possessed just enough heat to perfectly regenerate all this specified condensate to steam. This heat from the wall is given up to the steam by its corresponding weight of condensate during compression $r'-p'$ at each incremental temperature drop and only as it was needed for that same equal temperature change.

Heat Q from the glass 232 continues to flow into the copper 233 during the exhaust period $q$ to $q'$ and $q'$ to $r'$ and slightly raising the wall temperature above that of the steam and some of the heat flows from the copper into the exhaust steam, but only through a dry wall surface 234 throughout this period. This composite wall thus produces maximum effectiveness of the very low conductance of glass and so achieves an acceptably low wall heat loss over that of steel which even with a dry wall might still be considered prohibitive.

Figures 4, 6, 7:
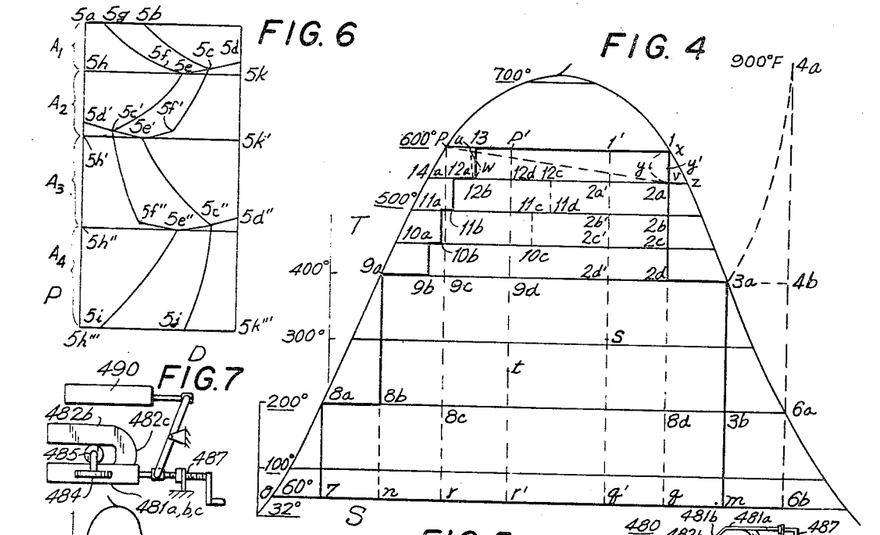
FIGURE 4 is a temperature-enthropy diagram showing the basic Carnot and Rankine cycles and the cycle of a multiple expansion engine incorporating the present invention superimposed thereon to show the heat converted to work in each instance.
FIGURE 6 is a pressure-displacement diagram of the engine illustrated in FIGURE 5 showing the pressure and displacement changes of every piston through both forward and return strokes.
FIGURE 7 is a plan view showing the cam faces and means for adjusting valve operation.

Compression will depart from the adiabatic line $r'$ to $p'$ FIGURE 4 for the conversion from work being done of enough heat to raise the copper liner 233 to the temperature of the initial steam and supply, as well, some heat to the glass 232 after passing above the temperature of the glass at $t$, FIGURE 4. This transferred heat is then exactly stored in copper 233 and then recovered during the expansion $1'-q'$, regeneratively as described above, and it does not therefore represent any loss of availability.

At the end of compression $p'$ more heat than necessary just to bring said copper liner up to initial temperature, has to have been provided by condensation on the copper surface 234 so as to supply in addition the heat lost by it to the glass 232. This amount is greater than the copper heat capacity for regeneration and would result in heat loss to the exhaust with the result of lowering the average glass temperature 232, except that all this condensate is wiped clean off the cylinder wall 234 by the piston ring 220 on the return stroke, and accumulated condensate on the piston face and cylinder head 200' surfaces is blown out.

Thus, all these said surfaces with which initial steam will come in contact are dry and heated to the same high temperature as the steam at the beginning of the cycle at the point of admission and continue to be so heated to supply the glass 232, heat Q during contact with admission steam $p$ to $1'$ and also $1'$ to $s$.

The cycles of temperature fluctuation of the copper and the glass do not coincide, but instead overlap as the temperature of the copper will be nearly identical to that of the steam, while that of the glass inevitably lags far behind. It is this characteristic that enables the copper to serve its purpose of regeneration, and this composite wall to reduce loss. The copper surface is at or near steam temperature when wet, but nearer glass temperature when dry so that when the heat flow is into the glass it is impeded by low glass conductance, but when at low steam temperature and heat flow is out from the glass, it creates a dry wall which further impedes it. This one phase of the transfer cycle effectively limits the wall loss. This gives the equivalent of operating with a perfectly dry gas as working fluid.

The selected weight of copper is such as to re-evaporate just the condensate resulting during admission of steam from $p$ to $1'$ and expansion $1'-s$, to supply the additional heat lost Q to the glass 232 during this period. The heat required by the glass during the compression stroke is received by the copper liner 233 from the resulting condensate all of which is purged. Copper 233, therefore, resupplies heat Q to the steam that was lost to glass 232, and rapidly to eliminate loss of availability as said glass alone would not do. Said glass later loses heat Q to copper and to exhaust steam but through a dry wall.

Therefore, although it is a different particular condensate that is being regenerated this does not affect the process. The only unrecovered loss of availability then is that heat from the glass 232 that is transferred to the exhaust steam mostly during the exhaust period $q'$ to $q$ to $r'$, only and through the dry wall 234 at the low rate of conductance of said glass. Heat lost into the wall is that lost out of it and therefore, conventionally, is the heat needed to reduce loss. The coper surface is at or near steam temperature of the wall throughout the exhaust period.

The advantages of composite wall of this invention can be observed by a comparison to that loss of availability that would occur through the glass 232 without the copper liner 233, and it can be seen that the copper by giving rapid regeneration drives all moisture off the wall 234 by the beginning of the exhaust period $q'$ during which its evaporation would cause large heat loss from the glass 232, to the far lower temperature of the exhaust nullifying the advantage of low glass conductance.

It can be further observed that a glass wall 232 without the copper liner 233, although beginning dry at admission point $p$, would acquire condensation as does the common cast iron wall, but at a slower rate and such condensate again due to lower conductivity, remains on the wall a longer time and through the lowest temperatures of the cycle, the exhausting period $q'-q-r'$. This results in a low average wall temperature which increases the rate of heat transfer from hot initial steam from which all heat given up by the wall must be originally obtained. The advantage of lower wall conductively is then offset by a longer period of heat transfer at exhaust temperature.

Although work energy W is put into the steam and transferred as heat energy Q to what amounts to two heat reservoirs, (1) copper and (2) moisture on the wall, these being raised in temperature during the otherwise adiabatic compression. This heat exchange is done reversibly as it is either (1) returned directly to work by the copper at the same temperature by regeneration, or (2) sent to the boiler as feed water, reheated at constant temperature and returned at initial steam temperature where it is converted to work by expansion at the same temperature at which it was previously condensed. All heat to copper comes from work of compression and is so returned to work. The first heat to glass 232 comes from compression, the rest of the heat comes from the boiler and is returned to the steam at a lower temperature during expansion and exhaust.

On the Temperature-Entropy chart FIGURE 4, the curve $x$ to $y$ to $z$, familiar in prior steam cycle diagrams, illustrates the wall losses. In the new system the compression process that heats the wall is analagous to the line $x$ to $y$, but differs in that heat is supplied reversibly instead of from initial steam. The purge system then removes this condensate of wall heating and sends it back to the boiler to begin the cycle over again as pre-heated feed water.

At the beginning of expansion and wall cooling which corresponds to point $y$, see FIGURE 4, the wall has some minor condensation thereon resulting from heat transfer into the glass during admission stroke $p$ to $1'$. The high conductance thin copper liner 233, FIGURE 2, then rapidly supplies the heat for regenerating this small weight of moisture and reversibly, at or near the temperature at which it received the necessary heat, which corresponds to the line $y$ to $z$, FIGURE 4, instead of the extensive cooling of the cylinder wall from $y$ to $z$ during expansion and exhaust strokes which would result in lowering the wall temperature. As this regeneration involves a very small part of the heat of the charge of steam, the process is shown as $x$ to $y'$ to $v$, FIGURE 4, very close to and slightly concave on the right of the adiabatic expansion line. Although all the heat given up to the copper 233 is returned at a lower temperature and therefore the steam has a greater entropy, the change is slight and shown as being on point $v$.

A clearer indication of the heat regenerative step of the process is line $p$ to $v$ in the diagram in FIGURE 4 which shows a slightly concave portion facing down (due to the increase in latent heat capacity at lower temperatures) and indicating that part of the fluid constituting said condensate at the liquid line at $p$ which is heated and regenerated to the high quality point $v$ as its pressure and temperature drops. This is the same line on which this weight of steam was compressed but as it was then mixed with all the working fluid, is shown as $12b$ to $u$, FIGURE 4. The copper 233 is of such a thickness that it's weight times it's specific heat provides a capacity for just that amount of heat required to vaporize that amount of this particular condensate deposited.

It can be observed from the following example, comparing the conventionally used Rankine cycle with the basic Carnot cycle, as hereinabove described, which uses the adiabatic compression step in place of the two following steps of the Rankine cycle, (1) complete condensation of all exhaust steam, $r$ to $o$, FIGURE 1 and (2) raising the pressure of the resulting incompressible condensate back to initial or boiler pressure $o$ to $p$. In the Carnot cycle the heat represented by the area directly under the line $r$ to $o$, FIGURE 4, is saved from rejection by the adiabatic compression $r$ to $p$ (which also returns the heat represented by the work area $r$ to $o$ to $p$ to the working fluid). In the Rankine cycle this heat under $r$ to $o$ is rejected which prevents any means of approaching the increase in efficiency of the Carnot cycle.

For example, in FIGURE 4 whereas the Rankine cycle $p$ to $1$ to $q$ to $o$ to $p$ gives an efficiency of 41.3%, the Carnot cycle $p$ to $1$ to $q$ to $r$ to $p$ gives one of 51.1% when figured as the ratio of the difference of the enthalpies of the end points of processes for an initial temperature $T_1$ of 600° F. and a sink temperature $T_2$ of 60° F. Figured from the difference in absolute temperature $$\left(e.i. \frac{T_1-T_2}{T_1}\right)$$

The Carnot efficiency is again 51% or an increase of 9.7% over Rankine.

| Cycle and method | Rankine by enthalpy | Carnot by enthalpy | Carnot by temperature |
|---|---|---|---|
| Formula | $\frac{h_1-h_q-FW}{h_1-h_o}$ | $\frac{h_1-h_p-(h_q-h_r)}{h_1-h_p}$ | $\frac{T_1-T_2}{T_1}$ |
| e for $\begin{cases} T_1=600° \\ T_2=0° \end{cases}$ | 41.3% | 51.1% | 51.0% |

Values; $h_1=1165$, $h_q=690$, $h_o=28$, $h_p=617$, $h_r=422$, FW=4.6 B.t.u.

It is old in the art and most practical to add and reject heat on a constant pressure line as is the case in boilers and condensers. Also, the best efficiency can only be obtained by adding all heat only at the highest possible temperature, that imposed by material limitations and which is then an isothermal process. As the coincidence of pressure and temperature occurs only in the vaporous region, the present invention uses the upper limit of this region when adding all heat as a means to obtain that best efficiency and therefore also to make this particular arrangement as practical and otherwise efficient as possible.

It can be observed that to achieve the highest efficiency, that is of the Carnot cycle, all heat must be added and rejected on isothermal lines as $p-1$ and $q-r$ in FIGURE 1. It is necessary and inevitable that those expansion and compression lines that connect these two isothermals must be (1) adiabatic, 1–q, r–p or (2) involve only a regenerative interchange of heat between the expansion and compression (which requires that one of them have a capacity to absorb heat while the other gives up the same amount as is the case in the Ericsson cycle).

The basic Carnot cycle specifies two continuous adiabatic processes which, therefore, by its unmodified use, excludes the possibility of an interchange of heat within the system, as there is no capacity in the adiabatic compression line r to p to absorb heat from the expansion line 1 to q.

It will be further observed that if continuous adiabatic expansion as 1 to q and compression r to p, FIGURE 1, are used it becomes necessary to use a comparatively large weight of steam at any high temperature-pressure process, because of the very small latent heat capacity per pound of steam on isothermal process p to 1, in order to absorb all the heat $Q_a$ that is necessary to produce the work required. And, as each pound of steam must reject only some of its heat at the sink temperature q in order to maintain the required heat content for adiabatic compression from r back to p, FIGURE 1, this weight of steam expanded at sink temperature than has a volume far greater than a smaller weight of steam for rejecting the necessary heat $Q_r$ by complete condensation q to o. This will be observed by the enclosed area 1 to q to r to p to 1, FIGURE 4, representing the net work in B.t.u. which is narrow, as the change of entropy $\Delta S_{fg}$ for latent heat of vaporization is small at high temperatures at p, and this same $\Delta s$ applies by the basic Carnot cycle in determining the range of heat rejection $Q_r$ at sink temperature at q. It is therefore a feature of the invention to so modify the Carnot cycle, as to provide an almost perfectly efficient regeneration of heat and thereby eliminate this disadvantage of large volumes.

It will further be observed that on a constant temperature pressure line in the vaporous region, it is the change in volume (and therefore quality) that determines the rejection of heat and that, for such a particular sink temperature line, a given $Q_r$ requires the same change of volume regardless of weight or initial and final volumes (or qualities), that is to say, regardless of any particular section (as q' to r') of the given sink, latent heat, line over which it occurs.

Therefore, to effect a minimum size of machine at the end of expansion (point q') in accordance with the present invention it will be desirable to condense to the liquid line o–p from any convenient quality point such as said q' (but one containing a weight of saturated steam that possesses all the necessary heat for rejection). The cycle, therefore will always involve the practically same volume change regardless of the weight of moisture present with it. The presence of various amounts of moisture giving different qualities does not effect the heat rejected as said moisture has the same heat and volume at all quality points and loses none going to the liquid line o–p.

It is the $Q_r$ that determines the length of said section as (q' to r') and therefore the higher the quality of the compression point r' (that is the further to the right it lies) the higher the corresponding expansion end point q'. As this creates an undesirable volume defeating the purpose of the regenerative cycle (transfer of heat between the working fluid at different stages), it is preferred to always condense clear to the liquid line o–p thereby enabling full use of whatever minimum weights of exhaust steam, which remain necessary to provide said full required volume of saturated steam and $Q_r$ that occur, as point q' moves to the right on the sink temperature line. Without weight reduction it is necessary to expand to a higher than minimum volume, but then to reduce it only by that amount (in this example 306 cubic feet) so as to reject only the said $Q_r$ required and retain the rest of the heat possessed that is necessary for compression to point p. It is advantageous, therefore, to reduce the weight of exhaust steam so it possesses in the following example just 306 cubic feet, at q' and is also in the high quality side of the sink temperature line so as to lose a modicum of piston displacement to the liquid present in the steam. Placing the expansion end point in the dry region is not herein considered preferred as it increases the volume (as at q') disproportionately to the heat capacity increase for $Q_r$ all as hereinafter described.

It will always be necessary to reject a minimum of heat (incurring in this example a minimum of 306 cubic feet). To reach this minimum volume in a single expansion step in the following example, it would be necessary to somehow end at a quality point q' of 25%.

With all the aforesaid in mind a single expansion process 1–q–r–p gives the following volume change for one pound of steam on the 60° line, due to the entropy change (which is constant between the two adiabatic processes at all lines) and gives these qualities $x_q$=.625 and $x_r$=.372
$V_q$=.016 and .625 (1208)=755 cubic feet
$V_r$=.016 and .372 (1208)=449 cubic feet
Volume change=difference=306 cubic feet.
Or, $V_{fg}$ 60° $\Delta S$=Volume Change=.254 (1208)=307 cubic feet, which agrees with the above table.

$h_{fg}$ 600°=548.4 B.t.u.; and $h_{fg}$ 60°=1059 B.t.u.

$\therefore Q_a$=548 B.t.u.; and $Q_r=$
(.625−.372) (1059) =<u>268 B.t.u.</u>

$$e=\frac{Q_a-Q_r}{Q_a}=\frac{548-268}{548}=\frac{280}{548}=51.1\%$$

Which agrees with the above table comparing efficiencies.

From this example the advantages of condensing to the liquid line are apparent and one of reducing final expansion volume from 755 cubic feet to 306 cubic feet or of about ⅖ its former volume. As hereinafter explained this is done by the use of the regenerative cycle, a particular feature of this invention and is achieved by the aforesaid reduction in weight.

A preferred apparatus for using the improved method of the present invention in a multiple expansion engine 430 is illustrated in FIGURE 5. The engine as illustrated has four cylinders 431, 432, 433, 434 each of which operates in substantially the same way as the cylinder illustrated in FIGURE 2, but in cooperation with each other. A turbine 460 and compresser 470 unit is shown connected to the last cylinder 434 and operates in the same manner as a cylinder in the improved cycle. It will be understood, however, that the use of a turbine-compresser unit is optional. The first cylinder 431 and the last expansion space, whether it be cylinder 434 or turbine 460, are connected to a boiler 410 and condenser 405, respectively.

The engine draws it's steam from boiler 410 through a supply pipe 411. Boiler 410 functions to raise the quality of very wet steam and it is provided with a condensate reservoir 420 having supply and return pipes 423 and 421, respectively, by which it is connected in parallel with the boiler and through which working fluid is supplied for increased load requirements.

A hollow piston 441 to 444 is provided in each cylinder 431 to 434, respectively, and the plurality of pistons are formed as a part of a hollow crosshead receiver 440. The hollow crosshead 440 is partitioned to form three separate chambers 445, 446 and 447 constituting receivers for the exhaust steam from each of the cylinder spaces 431, 432 and 433 and, in turn, is connected to discharge steam to the next cylinder.

When a turbine is used, the last cylinder 434 discharges steam through exhaust valve 449''' in its piston face, hollow articulated swinging arms, 404 and 404', constituting exhaust pipes, and connected to reheater 450. Reheater 450 comprises coils 451, which heats the steam to raise it to 100% quality before introducing it through pipe 452 into turbine 460.

Turbine 460 is connected through shaft 461 to drive the compound compressor 470–471. Turbine 460 also has a pipe 462, through which partially expanded steam is discharged from the turbine and injected into the third stage 471b of compressor 470–471. Turbine 460 is further provided with exhaust pipe 463 by which most, but not all, of it's fully expanded steam is discharged to and completely condensed in condenser 405 and then flows through line 466 having a pump 406 therein from condenser sump 405' to a mixing chamber 465 into which it is injected. Turbine 460 is further provided with exhaust pipe 464 by which the remainder of its fully expanded steam is discharged from 460b' to chamber 465, wherein it is greatly reduced in quality by said condensate and thereby made ready for compression in compressor 470. The steam is then further compressed to a liquid state in the first stage 471a of the centrifugal compressor. After liquefication the working fluid is again raised to a low quality steam by interjection of steam at the same pressure and temperature from said pipe 462.

The last stage 471b of the compressor 470 is connected to cylinder 434 by a line 467, through which working fluid is discharged from the compressor after reduction to a liquid and injected into the cylinder. The condensate is then mixed with remaining expanded steam in said cylinder space 343 and further compressed to the exhaust pressure of the second I.P. cylinder 433. A discharge line 437 connects cylinder 434 to cylinder space 433 and provides a passage through which low quality compressed steam is discharged and injected into the steam space 433 in the second I.P. cylinder.

Also a pipe 436 similarly connects the cylinder space 433 to cylinder space 432 through which expanded steam in the second I.P. cylinder 433 after compression to the same pressure and temperature of the exhaust steam remaining in 432, is injected into the latter space and mixed with the steam therein. Cylinder 432 is provided with a discharge pipe 435 through which, after compression of steam to the pressure-temperature of the exhaust steam in the H.P. cylinder space 431, discharged steam flows and is injected into the latter spaces where mixture occurs. After compression the steam is discharged back to said heater 410 through discharge pipe 412 by which the H.P. cylinder 431 is connected. The steam is thereby reraised in quality and begins the cycle over again.

During changes in load requirements the varying weights of steam required are supplied from reservoir 420 through dry pipe 423 to boiler 410. Pipes 412 and 423 constitute a return line to the boiler 410 wherein the steam is heated to initial steam quality. Some of the saturated steam leaving the boiler 410 returns through pipe 421 from its connection with pipe 411, to coils 422, and thereby supplies by condensation the heat of vaporization required for low quality steam leaving the reservoir 420. Suitable pressure responsive valves may be provided in lines 421 and 422 to insure proper circulation.

The crosshead assembly 440 is provided with a plurality of valve stems 483 which operate admission and exhaust valves 448 to 448''' and 449 to 449''', respectively. These valve stems 483 are suitably mounted and guided in said crosshead assembly 440 and therefore reciprocate with it and engage stationary and continuous cam faces 481a, b, c and 482a, b, c FIGURES 5 and 7, through follower rollers 484. Thus, valve stems 483 are actuated by said continuous cam faces 481a, b, c and 482a, b, c so as to operate valve 448 to 448''' and 449 to 449''' in accordance with any particular position of the crosshead 440 relative to stationary cylinders 431 to 434.

This apparatus is shown only as a preferred form of construction for practicing the invention as it gives commonly desired quick actuation and cut-off. Also, it is independent of the crankshaft operation (not herein shown) and is simple and otherwise effective in providing control. However, it will be understood that the valve function may be by a camshaft mechanically, hydraulically or otherwise actuated with various effects and advantages all. as is known in the prior art.

For clarity, all of said cam actuated valves 448 to 448''' and 449 to 449''' have a valve stem indicated by the reference character 483, one of which is illustrated as operating an admission valve 448''' in one piston 444 through a bell crank 485 and spring 486. As the crosshead 440 travels to the left the admission valve 448''' is open and roller 484 on the end of stem 483 engages cam surfaces 481a. When follower roller 484 encounters the decending surface 481b it is forced down against spring 486 and acting through bell crank 485 closes the valve. Follower roller 484 then rides along to the horizontal surface 481c until the crosshead reaches the end of its stroke to the left. Spring 486 thereafter forces stem 483 and its follower roller 484 upwardly and following 180 degrees around a semi-circular spiral surface 482a, without affecting the seating of valve 448'''. Roller 484 and stem 483 then return to the right and are held against surface 482b by spring 486 to an opposite spiral surface 482c which returns it under spring action to original cam face 481a, and thereby again opening admission valve 448''' to another cycle.

The advantage of these stationary but continuous cams, is that the admission cut-off point (1' FIGURE 1 and in like manner all other points) is readily changed by shifting the independent cam surface 481a, b, c by turning control handle and screw shaft 487, see FIGURE 7. When once adjusted, surface 482a, b, c must remain stationary.

Reverse operation of the engine is produced by a suitable mechanism for rotating the valve stem 485 from the position shown in FIGURE 7 so that the roller 484 rests on the surface 482b. Valves 448 to 448''' are then operated 180 degrees out of phase from that described above, with a corresponding opposite movement of the crosshead 440. The apparatus shown in FIGURE 5 having now been described in detail, its mode of operation is now explained with respect to FIGURES 4 and 6.

The path of the state points of the working fluid regarding its pressure, volume and transfer between cylinders of engine 430 can best be understood from FIGURE 6. In FIGURE 6 the piston displacement is shown relative to cylinder so as to produce mechanical work with highest actual efficiency. All said steam transfer to and from each cylinder is controlled by the same valves as hereinbefore described for the basic engine in FIGURE 2.

The path of the state points of the steam in H.P. cylinder 431, FIGURE 5 is represented in area A, of FIGURE 6. Each of the other three cylinders first I.P. 432, second I.P. 433 and L.P. 434, is represented by sections $A_2$, $A_3$ and $A_4$, respectively placed one atop the other to show the relation of the pressure-volume-displacements and the interconnections by which the steam is transferred from one to the other. The boxes $A_1$ to $A_4$ representing area are of an increasing height to represent the increasing cross-sectional area of the cylinders; ordinate, $5h'''$ to $5a$ represents the pressure of the steam as it drops from initial point $5a$ (or 1, FIGURE 4) down to the last cylinder exhaust $5i$ (or $2d$, FIGURE 4); and the abscissa $5h'''$ to $5k'''$ represents displacement of the piston, but not necessarily the volume of a pound of steam as is the case in pressure-volume P–V charts. For simplicity, the first number and/or letter following and representing any mentioned point of the steam will be understood to refer to FIGURE 6, while the send one in parenthesis refers to FIGURE 4, and that same identical state point of the steam but only of steam adjacent the face of the piston and gives its quality instead of piston displacement. The adiabatic expansion line $1'-2d'$ is used as being generally representative of all said lines from $1-2d$ to $p-9c$, and desired quality is controlled by valve 425 in line 424, FIGURE 5. The faces of all pistons are at all times on the same vertical line the steam space in $A_1$ and $A_3$ is to the left of said piston face line while the steam space in $A_2$ and $A_4$ is to the right of the piston face line.

In A, FIGURE 6, the displacement $5a$ (or $1'$) to $5b$ (or $1'$) is the admission stroke at the constant initial steam pressure, displacement $5b$ (or $1'$) to $5c$ or ($2a'$) is the expansion stroke and ends at pressure $5c$ (or $2a'$ approximately) which is that pressure remaining in the receiver 445, FIGURE 5, from the previous cycle and which is slightly higher than the H.P. cylinder 431 designed exhaust pressure ($2a'$). The difference between these points of FIGURE 5 that are close to exhaust, and the designed exhaust pressure is exaggerated in this figure to show the effects of different sizes of pistons and receivers in multiple expansions. This makes the state poinnts of FIGURE 4 approximate those of FIGURE 6. At displacement poinnt $5c$ ($2a'$), FIGURE 6, the discharge valve of first I.P. cylinder 432 opens and low quality steam at pressure equal to $5c$ (but at $12a$) is injected into 431 displacing from the head end of the cylinder the difference in volume between the two cylinders of drier exhaust steam (at $2a'$) out exhaust valve 449 into receiver 445. As the stroke of the pistons is the same in both cylinders one of the steam spaces 431 increases while the steam space 432 decreases during the injection-discharge stroke from $5c$ ($2a'$) to $5d$ ($2a'$). The exhaust displaced from 431 to receiver 445 then is the difference in volume of $(A_2-A_1)$ times the stroke length ($5d$ to $5c$). This causes a slight increase in pressure throughout spaces 432, 431 and receiver 445 up to the value of $5d$ ($2a'$). It is a particular feature of this invention that the steam transfer between any two cylinders of this multiple expansion engine occurs simultaneously so as to minimize the undesirable pressure change for any given size receiver. This provides the advantage of almost eliminating heat availability losses, in and out of the receiver wall.

The first part from $5d$ ($2a'$) to $5e$ ($2a'$) of the total exhaust stroke $5d$ ($2a'$) to $5f$ ($12b$) of H.P. cylinder 431 which part is equal to the admission stroke $5d$ ($2a'$) to $5e$ ($2a'$) of first I.P. cylinder 432 then occurs and valve 448' opens providing the admission steam of 432 from the total volume of spaces 431 and 445. As the stroke in each cylinder is equal and the expansion volume is then only $(A_2-A_1)$ times stroke ($5d$ to $5e$) greater than before the pressure in receiver 445 drops down to the pressure in H.P. cylinder 431 of value $5e$ (exactly $2a'$) at which point admission cut off of first I.P. cylinder 432 occurs by actuation valve 448' and its expansion stroke $5e$ ($2a'$) to $5c'$ ($2b'$) occurs. As all the weight of admission steam of a following cylinder must come from the exhaust of the preceeding one, this transfer is always at the same pressure, but as its area increases the H.P. 431 cylinder must continue to exhaust ($5e$–$5f$) after admission cut-off for a longer stroke than the admission to the first I.P. 432. This continued exhaust is only to receiver 445 causing a slight increase in pressure to point $5f$ ($12b$) which is then equal to that at $5c$ ($2a'$). Points $5e$ and $5f$ are not on a continuous curve to $5g$ as a break occurs at $5f$. The exhaust valve 449 then closes to seal the pressure in receiver 445 which is not opened again until point $5c$ ($2a'$) is again reached in the next cycle. The compression stroke $5f$ ($12b$) to $5g$ (13) then occurs followed by the discharged stroke from $5g$ (13) to $5a$ (13) back to the boiler 410 as in the basic engine hereinabove described and the H.P. is then ready to begin another cycle. It is desired to have compression end at points $10a$, $11a$, $12a$ and 13, FIGURE 4 each of which is at lowest quality that permits smooth and rapid fluid transfer between cylinders as complete liquid may not do, and while giving the smallest volume for injection into the next higher cylinder so as to reduce piston displacement volume lost by it.

At the end of its expansion stroke the first I.P. cylinder 432 at point $5c'$ ($2b'$) receives its injection of low, quality steam from the second I.P. cylinder 433 causing exhaust and compression into receiver 446 in a manner identical to that between the first two cylinders 431 and 432 as above described. From point $5d'$ admission valve 448'' opens and as before steam from receiver 446 and exhaust from cylinder 432 provide the steam of the admission stroke $5d'$ ($2b'$) to $5e'$ ($2b'$) which is followed by expansion stroke $5e'$ ($2b'$) to $5e''$ ($2c'$) as before, while the first I.P. cylinder 432 continues its exhaust through valve 449' to point $5f'$ ($11b$) compressing it into its receiver 446 just as the H.P. cylinder compressed steam into receiver 445 with a slight rise in pressure. At the end of expansion stroke $5e'$ ($2b'$) to $5c''$ ($2c'$) the second I.P. cylinder 433 repeats the injection stroke with the L.P. cylinder 434 and receiver 447 identically as above described.

This is followed by the admission stroke $5d''$ ($2c'$) to $5e''$ of L.P. cylinder 434 through valve 448''', and the second I.P. cylinder 433, then exhausts $5e''$ ($2c'$) to $5f''$ ($10b$) and compression $5f''$ ($10b$) to $5c'$ ($11a$) and these steps are followed by expansion stroke $5e''$ ($2c'$) to $5i$ ($2d'$) injection to $5h'''$ ($2d'$), exhaust to reheater 450 and $5j$ ($9b$) and then compression $5j$ ($9b$) to $5c''$ ($10a$) and the quadruple expansion cycle is repeated.

The steam is reheated in 450 to 100% quality at ($3a$) and alternatively superheated (not shown) to ($4a$) then admitted through pipe 452 ($3a$ or $4a$) and expanded in turbine 460 to point $460a$ ($3b$ or $6a$) and further to points $460b$ and $460b'$ ($m$ or $6b$) then from the former proceeds to 405 ($o$) and then to 465 (7), and from the latter $460b'$ ($m$ or $6b$) direct to 465 (7). Low quality steam then discharges from 465 to 470 and thereby to $471a$ ($8a$) to $471b$ ($8b$). Also steam flows from $460a$ ($3b$ or $6a$) to $471b$ ($8b$) where it mixes with the liquid of ($8a$) giving ($8b$) and then flows back to L.P. cylinder 434 through injection line 467, after completion of compression to liquid ($9a$) at end of 471.

The volume of this liquid ($9a$), or low quality steam corresponds to distance $5i$ to $5h'''$ and is controlled by the speed of the turbine 460 and compressor 470–471 in relation to that of the cylinder 434 all of which are preferably coupled together.

Thus, compression followed by discharge-injection strokes returns the steam along path of thermodynamic steps shown in FIGURES 1 and 4 with appropriate transfers (not designated) as follows: $5j$ ($9b$) to $5c''$ ($10a$); and $5f''$ ($10b$) to $5c'$ ($11a$); and $5f'$ ($11b$) to $5c$ ($12a$); and $5f$ ($12b$) to $5g$ (13); then back to the boiler 410.

To allow easy comparison between various arrangements of cycles obtained by shifting expansion and compression lines, the same values $Q_r$ and $Q_a$ for given temperature limits are retained and a weight of one pound of steam is used. In an example of the preferred multiple expansion engine illustrated in FIGURE 5 said one pound of saturated steam is specified in the mixture at point $m$, as a basis to begin all calculations of the cycle. However at no point is the total weight of working fluid necessarily only one pound. The condensation of one pound of saturated steam to a complete liquid at $o$, at the given sink temperature of 60 degrees F. requires the rejection $Q_r$ of just 1059 B.t.u. The weight of moisture, $y$ present does not affect this process.

In this example the overall cycle is first divided into temperature limits selected to give minimum wall losses; and the quality points at the end of each expansion, (as $3b$) in a line between reheating processes (as lines 1–$2d$ and $3a$–$m$), are given by the entropy of the state point of the initial steam for that line; and quality points at the end of each compression (as $8a$, $10a$) are selected for smooth operation or to control the length of the admission stroke, and the entropy of these, in turn, gives the quality at the point beginning the compression (as 7).

In the example, only the state points for full load are considered but it will be understood that in practice all state points are shifted to vary the work output for partial load.

The following table lists all the useful values for the various state points and calculated values for quality of steam at the various points.

(2) The weight of the total steam at the beginning of a compression point equals ($W_{en}$ and $W_{cn}$ and is of quality $x_t$.

STATE POINT VALUES TABLE.—TEMPERATURE, ° F.

|  | 600° F. | 550° F. | 500° F. | 450° F. | 400° F. | 200° F. | 60° F. |
|---|---|---|---|---|---|---|---|
| P | 1543# | 1045# | 681# | 423# | 247# | 11.5# | .2561# |
| $S_f$ | .8130 | .7498 | .6888 | .6280 | .5664 | .2938 | .0555 |
| $S_{fg}$ | .5176 | .6347 | .7440 | .8518 | .9610 | 1.4822 | 2.0380 |
| $S_g$ | 1.3305 |  |  |  | 1.5273 |  |  |
| $h_f$, B.t.u | 617.0 | 549.3 | 487.8 | 430.1 | 375.0 | 168.0 | 28.07 |
| $h_{fg}$, B.t.u | 548.4 | 640.9 | 714.0 | 774.9 | 826.0 | 977.8 | 1,059.1 |
| $h_g$, B.t.u | 1,165.2 |  |  |  | 1,201 | 1,145.8 |  |
| $V_f$, ft.³ | .0236 | .0218 | .0204 | .0194 | .01864 | .0166 | .01603 |
| $V_{fg}$, ft.³ | .2432 | .4021 | .6544 | 1.080 | 1.8450 | 33.62 | 1208 |
| $V_g$, ft.³ | .2668 |  |  |  | 1.8632 |  |  |
| End compr. point | 13 | 12a | 11a | 10a | 9a | 8a | o |
| Quality x | .10 | .10 | .10 | .10 | 0 | 0 | 0 |
| Sn | .8648 | .8133 | .7632 | .7132 | .5664 | .2938 | .0555 |
| Begin compr. pt |  | 12b | 11b | 10b | 9b | 8b | 7 |
| Quality x |  | .1812 | .1673 | .1584 | .1528 | .184 | .117 |
| Sn |  | .8648 | .8133 | .7632 | .7132 | .5664 | .2938 |
| Expan. point | 1 | 2a | 2b | 2c | 2d/3a | /3b | /m |
| Quality x | 1.00 | .915 | .862 | .8244 | .795/1.00 | .833 | .722 |
| Sn | 1.3305 | 1.3305 | 1.3305 | 1.3305 | 1.3305/1.5273 | 1.5273 | 1.5273 |

The adiabatic expansion and compression between any two temperature limits always use exactly the same weights of steam, while proceeding in opposite directions and whereas the expansion process ends in a division of its weight of steam, the compression is followed by an addition to its weight giving a new state point at higher quality. Both combine through a constant temperature heat exchange. Therefore the weights of 1.578 lbs. at $m$, which is that after $3b$, and to $m$ is also that at the two points 7 to and at $8a$.

In the following example $W_{en}$ is the weight of steam taken from an expansion end point as $3b$ for regeneration where $n$ is the number of the point in FIGURE 4. The weight remaining after division to continue expansion as to $m$ is designated $Wa_n$ ($a$ for adiabatic). $W_{cn}$ is the weight of compressed steam and $x_{en}$ and $x_{cn}$ are the qualities, respectively, and $x_{tn}$ is the quality of the combined total.

Having calculated the quality of all points in FIGURE 4 and assuming the one pound (1#) of saturated steam remains in the mixture at the final expansion point $m$, the weight of steam undergoing a change between any two points is then calculated as follows:

(1) The quality $x_m$ then gives that part of the weight of steam mixture at $m$, (1 lb.) which with $y$, (weight of moisture) is condensed to liquid at point $o$ as being equal to $$\frac{1}{x} = \frac{1 \text{ lb.}}{.722} = 1.385 \text{ lbs. as } x = \frac{1}{1+y}$$

and therefore $W_o = 1.385$ lbs.;

The weight of saturated steam therein is ($W_{en} \cdot x_{en}$) and ($W_{en'} \cdot x_{tn'}$) and equals ($W_{en} + W_{cn'}$) $x_{tn''}$ as none goes elsewhere. From this relationship the weight of regenerative steam $W_{en}$ is found as follows;

$$(W_{en} \cdot x_{tn''}) - (W_{en} \cdot x_{en}) = (W_{cn'} \cdot x_{cn'}) - (W_{cn'} \cdot x_{tn''})$$

and $$\therefore W_{en} = W_{cn'} \frac{x_{cn'} - x_{tn''}}{x_{tn''} - x_{en}}$$

and $$\therefore W_{en} = W_{cn'} \frac{x_{cn'} - x_{tn'}}{x_{tn''} - x_{en}}$$

(3) from (1) the steam remaining at $m$, to be used for regeneration of that at $o$ is by the above formula:

$$We_m = Wo\left(\frac{x_o - x_l}{x_7 - x_m}\right) = 1.385 \text{ lbs.} \left(\frac{1 - .117}{.117 - .722}\right)$$

$$We_m = .1934 \text{ lbs.}$$

The calculation of the values of weights of steam at each step gives the following table of weights which illustrates the results. The irregularity, however, is to be noted at the points $2d$ to $3a$ before steam exhaust from the reciprocating engine enters the turbine. At these points the quality at $2d$ is raised to 100% at $3a$. To accomplish this, a weight of steam equal to 5.22 lbs. is condensed to liquid of $9a$ and appears as an irregular reduction in weight passed on to the turbine. Otherwise, the table follows an approximate regular pattern.

TABLE OF STEAM WEIGHTS

[And Exp. Ratios and Weight Ratios = Displacement Ratios]

|  | Compression Steps |  |  |  |  |  |  |
|---|---|---|---|---|---|---|---|
|  | 12b-13 | 11b-12a | 10b-11a | 9b-10a | 8b-9a | 7-8a | at o |
| Weight comb | $W_{12a} + W_{e2a}$ | $W_{11a} + W_{e2b}$ | $W_{10a} + W_{e2c}$ | $W_{9a} + W_f + W_{e2d}$ | $W_{8a} + W_{e3b}$ | $W_o + W_{em}$ | $1/x_m$ |
| Calc. values | 3.76# + .416# | 3.43# + .332# | 3.15# + .277# | 2.02# + .522# + .606# | 1.58# + .446# | 1.39# + .193# | 1#/.722 |
| Total | 4.18# | 3.76# | 3.43# | 3.15# | 2.02# | 1.58# | 1.385# |
| Weight comb | $W_{13}$ or $W_1$ | $W_1 - W_{e2a}$ | $W_{a2a} - W_{e2b}$ | $W_{a2b} - W_{e2c}$ | $W_{a2c} - W_r - W_{e2b}$ | $W_{a2b} - W_{e3b}$ | $W_{a3b} - W_{em}$ |
| Calc. values | 4.18# | 4.18# - .416# | 3.76# - .322# | 3.43# - .277# | 3.15# - .522# - .606# | 2.02# - .440# | 1.58# - .193# |
| Expan. steps | 1-2a | 2a-2b | 2b-2c | 2c-2d | 2d-3a-3b | 3b-m | At m-o |

The overall efficiency $e$ can be found from the values at 13 and 1 and weights $W_{13}$ and $W_m$:

At 13 to 1;

$$Q_a = h_{fg}(\Delta x)W_{13} = 548.4\ (.90)\ 4.18\ \text{lbs.} = 2,065\ \text{B.t.u.}$$

At $m$ to $o$;

$$Q_r = h_{fg}(\Delta x)W_o = 1059\ (.722)\ 1.385\ \text{lbs.} = 1059\ \text{B.t.u.}$$

$$W = Q_a - Q_r = 2065 - 1059 = 1006$$

$$e = \frac{W}{Q_a} = Q_a - \frac{Q_a - Q_r}{Q_a} = \frac{1,006}{2,065} = \underline{48.7\%}$$

By the Carnot formula:

$$= \frac{T_1 - T_2}{T_1}$$

$$e = \frac{1059° - 519°}{1059°} = \frac{540°}{1059°} = \underline{51.0\%}$$

the descrepancy between 51.0%–48.7% of 2.3% must be attributed to inaccuracy of the steam table values and to carrying calculations to only three places.

The work done in each successive expansion in the engine and turbine is as follows:

| | | |
|---|---|---|
| 600° to 550°, 1–2a–12b–13 equals | Net work 22 · Weight (4.18) equals | Gross work, B.t.u. 92 |
| To 500°, 2a–2b–11b–12a equals | Net work 27 · Weight (3.76) equals | Gross work, B.t.u. 101.5 |
| To 450°, 2b–2c–10b–11a equals | Net work 28 · Weight (3,143) equals | Gross work, B.t.u. 96.5 |
| To 400°, 2c–2d–9b–10a equals | Net work 29 · Weight (315) equals | Gross work, B.t.u. 91 |
| Total for cylinder | | 381.0 |
| To 200°, 3a–3b–8b–9a equals | Net work 191 · Weight (2.02) equals | Gross work, B.t.u. 386 |
| To 60°, 3b–m, 7–8a equals | Net work 174 · Weight (1.58) equals | Gross work, B.t.u. 275 |
| Total for turbine | | 661 |

Total work done by power plant = 381 + 661 = 1,042 B.t.u.

Which compares with 1006 B.T.u. of work obtained from $Q_a - Q_r$ and gives an efficiency $$e = \frac{W\ \text{total of steps}}{Q_a\ \text{heat added}} = \frac{1042}{2065} = 50.5\%$$

which agrees closely with the value from the Carnot formula.

To calculate the advantage of superheating the weight of steam 2.021 lbs. at $3a$ in this example is superheated to $4a$ for expansion to $6a$. This changes the weight at $8b$, $6b$, $o$, $7$ and $8a$ and the weights to give the same quality of the exhaust steam condensed from $6b$ to give the same point $7$. If the steam expanded to $3a$ is superheated to point $4a$ before continuing expansion letting $4a$ be at 892° F. corresponds to a pressure 247 lbs. with entropy of $6a$. Calculations by standard formulas then give a quality of $x_{6b}$ when $x_{6a}$ equals 100% of .845. In accordance with the formula previously explained the weight $We_{6a} = 3.17$ lbs. and weight of steam $W_{6a-6b} = 1.65$ lbs. and $We_{6b} = .229$ lbs. This gives a total weight at $W_o = 1.42$ lbs. Therefore, $Q_r$ (heat rejected) = 1270 B.t.u. and $Q_a$ (a combination of initial heat 2065 B.t.u. plus heat added as superheat 540 B.t.u.) = 2605 B.t.u. The difference is $W = 1335$ B.t.u. and $$e\ \text{(thermal efficiency} = \frac{\text{Work}\ (1335)}{\text{Heat in}\ (2605)} = 51.3\%)$$

It will be observed that superheat to a high temperature has added little improvement to the efficiency previously obtained and this shows the measure of advantage of staying in the vapor region in accordance with this invention.

The present invention also may be practiced in a multiple cylinder engine which uses cylinders of identical size and eliminates receivers. This is a special case of the general design herein above described. For example, when applied to an engine like that illustrated in FIGURE 5 with all cylinders of equal size, the last cylinder 434 which accommodates the largest expansion $2c$–$2d$ determines the size of all of them. Accordingly, all of the preceding cylinders are oversized for the expansions therein and results in an idling of a part of their strokes $5a$–$5k$ by increasing the quality of the steam to be compressed at $10b$, $11b$, and $12b$ so as to provide a larger volume for the discharge-injection strokes thereby reducing that volume remaining in the higher step cylinder, and allowing for the final expansion of its admitted steam all thereby compensating for its increased size. All variations with the preceding example resulting from this design are therefore in the weights of steams used for each step and in the qualities of steam for compression.

It will be observed that by using said cylinders (all of the size for the last expansion) that expansion during transfer between cylinders is eliminated and thereby also the need for receivers making possible the use of a single piston with an internal passage reciprocating in one continuous double ended cylinder for two expansions each using the central portion of the cylinder wall in common and thereby allowing compactness over the former design. Also with cylinders of equal size all of the corresponding exhaust and admission valves can be operated together as one assembly thereby simplifying valve operation to two groups for any number of cylinders. In this design it is seen that the increased volume of the enlarged higher stage cylinders substitute for the receiver volumes, functioning by containing a greater weight which in effect is recirculated in the cycle of each step so as to idle a part of the cylinder capacity. The heat conversion to work in this design is held to that same former amount for the cycle regardless of the increased weight used, by reducing the quality change correspondingly.

In addition to conventional methods of reducing work output as by reducing the amount of admitted steam supplied, three other methods are contemplated in the present invention which comprise (1) the shifting of the compression lines on the diagram in FIGURE 4 to the right to reduce the work area that is between the adiabatic lines; and (2) shifting the expansion lines to the left with same effect; and (3) by reducing the compression point qualities so as to end compression on the liquid line which derives from recirculating a large quantity of moisture in each step of the cycle enabling compression to the liquid line. It will therefore be seen that variations may be made in practicing the steps of the method without departing from the spirit or scope of the invention.

While two embodiments of the invention are herein illustrated and described it will be understood that further modifications may be made in the method and engines for practicing the method. For example, the cycle may be operated nearer the liquid line by recirculating moisture to permit a final compression to the volume of liquid only; steam may be recirculated so as to adjust the effective displacement volume of any particular cylinder to permit the use of cylinders of equal volume without receivers, or the receivers may be located externally of the pistons and cylinders and be located in the injection lines to permit adjustment of the time of injection. It is also contemplated to use cylinders of equal size without receivers as stated above which allows the central portion of a common cylinder wall to operate for two expansions, deliver working fluid between steam spaces through hollow piston rods by means of an external connection and by using a plurality of working fluids to reduce volume and increase MEP at low temperature, all for the ultimate purpose of providing a more compact engine.

What is claimed is:

1. A method of increasing the useful work produced by steam with the aid of an engine which comprises the steps of supplying steam at a pressure approaching the critical pressure and temperature of steam, expanding the steam adiabatically against a moving part to do work, condensing at least a part of steam, exhausting steam at the condensing temperature at a place remote from the walls of the engine to prevent heat removal therefrom, compressing part of the expanded steam adiabatically, injecting the condensate into the steam prior to compression, injecting superheated steam into the compressed steam adjacent the end of the compression step to remove all moisture from the walls of the engine, heating the compressed steam to its original temperature, storing heat in the engine walls during compression of the steam and delivering the stored heat back to the steam during expansion to provide a reversible heat regenerating effect between the compression and expansion steps and maintain a substantially overall constant temperature in the walls of the engine.

2. In a method of increasing the useful work produced by steam with the aid of an engine in which the steam is supplied at a high pressure and temperature, expanded adiabatically to a lower pressure, subjected to a low temperature to condense at least a part of the steam, the remaining steam and condensate compressed back to its initial pressure adiabatically and the condensate discharged, that improvement which comprises the step of storing heat in the engine walls during the compression step and delivering the stored heat back to the steam during expansion to provide a reversible heat regenerating effect between the compression and expansion steps and to produce a dry wall at the end of expansion.

3. A method in accordance with claim 2 which comprises exhausting the expanded steam at a location remote from the walls of the engine to prevent heat removal therefrom.

4. A method in accordance with claim 2 which comprises ejecting all condensate after completion of the discharge of condensate to provide dry engine walls at the time of introducing a new supply of steam to repeat the cycle.

5. An engine for increasing the useful work produced by steam comprising a casing having a movable part therein to provide a chamber of gradually increasing volume in which the steam expands and of decreasing volume in which steam is compressed, inlet port in the casing for supplying steam between the movable part and casing, valve for opening and closing the port to supply steam to the casing, an exhaust port in the movable part and spaced from the walls of the casing, said exhaust port being connected to a condenser, a valve for controlling the exhaust port, an injection port in the casing intermediate the ends of said chamber in which the steam expands, a pump connected to inject condensate from the condenser into the chamber through the injection port, a port in the casing for injecting superheated steam, a port for exhausting compressed steam, and a port in the casing for purging condensate from the casing.

6. An engine for increasing the useful work produced by steam comprising a cylinder, a movable piston in the cylinder, a piston rod for transmitting motion from the piston to produce mechanical work, an annular inlet port adjacent the head end of the cylinder, a slidable ring valve for opening and closing the inlet port to supply steam to the cylinder, an exhaust port in the piston, a condenser, passage between the exhaust port in the piston and condenser, an injection port in the wall of the cylinder, a pump connected to deliver condensate from the condenser to the cylinder through the injection port, a port in the head end of the cylinder for supplying superheated steam thereto, a port for exhausting compressed steam from the cylinder, said piston having an annular space at its periphery, a passage connecting the piston face to the annular space, a one-way valve controlling flow through the passages, a passage in the cylinder wall for connecting the chamber adjacent the head end of the cylinder to the annular space of the periphery of the cylinder, a port in the cylinder for purging condensate from the annular space at the periphery of the piston, and at least some of the walls forming the steam space in the cylinder having a surface of a high heat conducting material and heat insulating material surrounding the surface of high heat conducting material whereby to absorb and deliver heat from and to steam in said cylinder.

7. A power plant comprising a boiler, a condenser and a multi-cylinder engine which increases the useful work produced by steam in which each cylinder has a piston therein with a passage, a port through which steam and condensate may be injected, and a discharge valve for exhausting working fluid therefrom, a crosshead connected to the piston in each cylinder to transmit motion to a member for producing mechanical work, conduit means for connecting the boiler to at least one of the cylinders to supply steam thereto, an exhaust valve in the piston in said cylinder to exhaust part of the steam therefrom, an inlet valve in the piston of another cylinder to supply steam, thereto, means providing a passage from the piston in the first mentioned cylinder to the piston in the second mentioned cylinder, each of the pistons in the other cylinders having inlet and exhaust valves for controlling the delivery of steam to each cylinder therein and exhaust of steam therefrom, means connecting an outlet port in the head end of each cylinder to another cylinder, said means connecting the last cylinder having a condenser therein for condensing part of the steam, and conduit means for connecting the outlet port in the head end of the first mentioned cylinder to the boiler to reheat the injected steam back to its original state.

8. A power plant in accordance with claim 7 in which each piston has a passage therein through which steam exhausts, said crosshead having partitions to form a separate chamber for each piston, and said chamber in said crosshead being connected to receive steam from one cylinder through its piston and deliver steam to another cylinder through its piston.

9. A power plant in accordance with claim 7 in which a steam turbine is connected in the conduit between the outlet from said last cylinder and the condenser.

10. A power plant in accordance with claim 7 in which a reheater is provided between the outlet from one cylinder and the inlet to another cylinder to increase the quality of the steam before admission to said second cylinder at a constant pressure and temperature.

11. A method of increasing the useful work produced by steam with the aid of a multiple expansion engine which comprises the steps of supplying a fixed quantity of steam to one place of expansion, expanding the steam adiabatically, delivering steam from said first place of expansion to another place of expansion, successively, through the plurality of places of expansion, exhausting part of the steam supplied at each place of expansion, compressing the remainder of the steam at each place of expansion, reducing the quality of said portion of the steam remaining at each place of expansion for compression by injecting condensate therein, compressing the steam of reduced quality to its initial pressure, and said injected condensate being discharged from a subsequent place of expansion whereby to provide a heat regenerative step including the retention of expanded steam at each place of expansion which thereby reduces the volume of steam in subsequent stages of expansion, combines the steps of expansion and reception of steam and the steps of exhaust and compression.

12. A method in accordance with claim 11 in which heat is added to steam expanded to a lower quality in one cylinder by condensing part of said steam at a slightly higher pressure and temperature in heat exchange with the remaining portion to induce heat flow and thereby increase the quality of the remaining portion of the stream.

13. A method in accordance with claim 11 in which the steam is supplied to at least one turbine in the multiple expansion steps.

14. A power plant in accordance with claim 11 which comprises the steps of increasing the period of discharge from each cylinder with corresponding decreases in the period of steam admission thereto, and increasing the time of injection into each cylinder with corresponding decreases in the time when steam is exhausted from the cylinder whereby to maintain a more uniform wall temperature for varying load conditions.

15. In a method of increasing the useful work produced by steam with the aid of an engine having a compressed steam space confined by surfaces and in which the steam is admitted at a pressure and temperature above atmospheric, expanded adiabatically to a lower pressure, subjected to a low temperature to condense at least a part of the steam, compressed adiabatically back to its initial pressure and heated to its initial state, that improvement which comprises the steps of injecting the condensate into the steam prior to compression, and ejecting all condensate from the surface forming the compressed steam space prior to the admission of steam to repeat the cycle to provide dry walls in the steam space.

16. In an engine for increasing the useful work produced by steam comprising a cylinder, a piston movable in said cylinder, a piston rod connected to said piston for transmitting motion from said piston to produce mechanical work, inlet and outlet ports in the head of said cylinder, that improvement comprising a passage in the piston from the cylinder space at one side of the piston to a location exterior of the cylinder space acting on the piston and forming an exhaust port in the piston face so located as to minimize turbulent flow of steam in the cylinder during exhaust and maintain a constant exhaust pressure, a valve in the port in the piston for controlling exhaust from the cylinder, a condenser connected to said exhaust port in the piston, an injection port in the cylinder wall, and a pump connected between the condenser and injection port to inject the condensate into the cylinder.

17. An engine in accordance with claim 16 in which the port in the piston being located at its axis, the piston rod being hollow and connected to the port in the piston face, a crosshead connected to the hollow piston rod and having a passage therein, and hollow linkage connecting the passage in the crosshead to the condenser to deliver exhaust steam from the cylinder to the condenser during reciprocation of the piston.

18. In an engine for increasing the useful work produced by steam comprising a cylinder, a piston movable in said cylinder, a piston rod connected to said piston for transmitting motion from said piston to produce mechanical work, inlet and outlet ports in the head of said cylinder, that improvement comprising a passage in the piston from the cylinder space at one side of the piston to a location exterior of the cylinder space acting on the piston and forming an exhaust port in the piston face so located as to minimize turbulent flow of steam in the cylinder during exhaust and maintain a constant exhaust pressure, a valve in the port in the piston for controlling exhaust from the cylinder, an additional port in the head of said cylinder for supplying super-heated steam, an outlet port in the wall of the cylinder for purging condensate therefrom with the steam, said piston having an annular recess intermediate its ends, said cylinder wall having a passage for connecting the forward end of the cylinder to the annular recess in the piston, and said port for purging condensate being arranged to overlie the annular recess in the piston when the latter is adjacent the head end of the cylinder.

19. In a steam engine having at least one cylinder and a piston therein, the combination with said elements in a steam engine or a condensate purging means, said cylinder comprising a casing of structural steel having a copper surface liner of high heat conductivity acting as a regenerator enclosed in insulation for converting condensate to steam by heat stored in the wall during compression, said surface liner being of a measured heat capacity to regenerate the fixed amount of condensate occurring after purging, said regeneration occurring at substantially the same temperature at each increment of expansion at which heat was received correspondingly during compression so as to achieve a minimum loss of heat availability while affecting a dry wall during expansion and exhaust.

References Cited

UNITED STATES PATENTS

| | | | |
|---|---|---|---|
| 2,132,212 | 10/1938 | Johansson | 60—21 |
| 2,315,011 | 3/1943 | Quiroz | 92—169 X |
| 2,807,081 | 9/1957 | Black | 91—422 X |
| 2,939,286 | 6/1960 | Pavlecka | 60—92 X |
| 3,118,349 | 1/1964 | Combs | 91—422 X |
| 3,126,348 | 3/1964 | Meijer | 60—24 X |
| 3,165,983 | 1/1965 | Thomas | 92—169 |

FOREIGN PATENTS 701,758    1/1931    France.

CARROLL B. DORITY, Jr., Primary Examiner

U.S. Cl. X.R.

60—64; 91—222, 422; 92—110, 144, 169